Fig.1

June 4, 1957  F. E. BUSCHBOM  2,794,560
SILO UNLOADER

Filed Oct. 29, 1953  8 Sheets-Sheet 2

FIG. 2

INVENTOR.
FLOYD E. BUSCHBOM
BY
ATTORNEYS

June 4, 1957

F. E. BUSCHBOM 2,794,560

SILO UNLOADER

Filed Oct. 29, 1953

INVENTOR.
FLOYD E. BUSCHBOM

BY Paul, Moore & Dugger

ATTORNEYS

June 4, 1957

F. E. BUSCHBOM

2,794,560

SILO UNLOADER

Filed Oct. 29, 1953

INVENTOR.
FLOYD E. BUSCHBOM
BY Paul, Mooner Dugger
ATTORNEYS

June 4, 1957  F. E. BUSCHBOM  2,794,560
SILO UNLOADER

Filed Oct. 29, 1953  8 Sheets-Sheet 5

FIG. 8

INVENTOR.
FLOYD E. BUSCHBOM
BY
Paul Moore & Dugger
ATTORNEYS

June 4, 1957 F. E. BUSCHBOM 2,794,560
SILO UNLOADER

Filed Oct. 29, 1953 8 Sheets-Sheet 6

INVENTOR.
FLOYD E. BUSCHBOM
BY
ATTORNEYS

June 4, 1957  F. E. BUSCHBOM  2,794,560
SILO UNLOADER

Filed Oct. 29, 1953  8 Sheets-Sheet 7

INVENTOR.
FLOYD E. BUSCHBOM
BY
ATTORNEYS

June 4, 1957  F. E. BUSCHBOM  2,794,560
SILO UNLOADER
Filed Oct. 29, 1953  8 Sheets-Sheet 8

INVENTOR.
FLOYD E. BUSCHBOM
BY
ATTORNEYS

United States Patent Office 2,794,560
Patented June 4, 1957

2,794,560

SILO UNLOADER

Floyd E. Buschbom, Albert Lea, Minn.

Application October 29, 1953, Serial No. 389,080

31 Claims. (Cl. 214—17)

This invention relates to new and useful improvements in silo unloaders and more particularly to new and useful improvements in a silo unloader of the type disclosed in the earlier filed application of Frederick E. Van Dusen, Ser. No. 231,562, filed June 14, 1951, now Patent No. 2,719,058 September 27, 1955. More specifically, this invention relates to silo unloaders of the type having a rotary ensilage collecting means for bringing the ensilage into approximately the center of the silo, means for elevating the ensilage and means for delivering the ensilage from the silo.

Silos, since their inception, have presented the problem of easy and ready removal of the ensilage therefrom. This is particularly intensified by the fact that relatively small quantities of ensilage are removed frequently and often times daily.

Present day silos usually comprise an upright cylinder, closed at the top with a conical or dome roof and having a closed bottom. The cylindrical wall of the silo is provided with a series of removable doors extending vertically up one side of the silo with an exterior chute covering these doors. The ensilage is packed in the silo and serves to maintain the chute doors in place up to the level of the ensilage. As the level descends, the doors are removed one by one.

The usual method for removing ensilage from the silo is to climb up the silo chute, stand on the level of the ensilage and pitch the quantity of ensilage desired to be removed down the chute. Particularly, when the ensilage has been frozen, this is time consuming and sometimes dangerous. Many attempts have been made, over a great length of time, to solve this problem, and prior to the application of said Frederick E. Van Dusen, have been remarkably unsuccessful. Various automatic unloaders have been proposed for removing the ensilage from the silo, but these unloaders have been unsatisfactory since they have required special adaptation of the silo, or are extremely complicated, cumbersome, or expensive to construct, and do not provide the desired adaptability and positive rate of flow of ensilage.

It is therefore an object of this invention to provide a mechanically operated silo unloader for the unloading of ensilage from a silo.

It is a further object of this invention to provide a new and useful silo unloader of rugged and inexpensive construction, which may be readily utilized in conventional silos and does not require modification thereof.

It is a further object of this invention to provide new and useful improvements in silo unloaders, whereby positive collection, elevation and ejection of the ensilage from the silo is provided.

It is still a further object of this invention to provide a new and useful silo unloader whereby desired quantities of ensilage may be removed frequently and which unloader will operate under adverse conditions and requires little or no servicing.

Still a further object of this invention is to provide a silo unloader so designed as to collect ensilage from the upper surface thereof and to positively feed the ensilage laterally through the silo wall.

Still a further object of this invention is to provide in a silo unloader having means arranged to rotate on the upper surface of the ensilage, an improvement in the means for collecting and elevating such ensilage and for ejecting the same laterally from the silo.

It is still a further object of this invention to provide a silo unloader of relatively foolproof construction, which is rugged and capable of being operated by unskilled or inattentive people, which is extremely simple in construction and operation, and which is able to unload ensilage from a silo with a minimum of attention and a maximum of efficiency of operation.

Other and further objects of the invention reside in the specific constructional details of the invention, including the constructional details of the gathering or collecting arm, apparatus for driving the same, structure for elevating the ensilage at the center of the silo to the discharge means and in the constructional details of the discharge means.

Other and further objects of this invention are those apparent and inherent in the apparatus as described, pictured and claimed.

This invention will be described with reference to the drawings, forming a part of this application, in which corresponding numerals refer to the same parts and in which.

Figure 1:
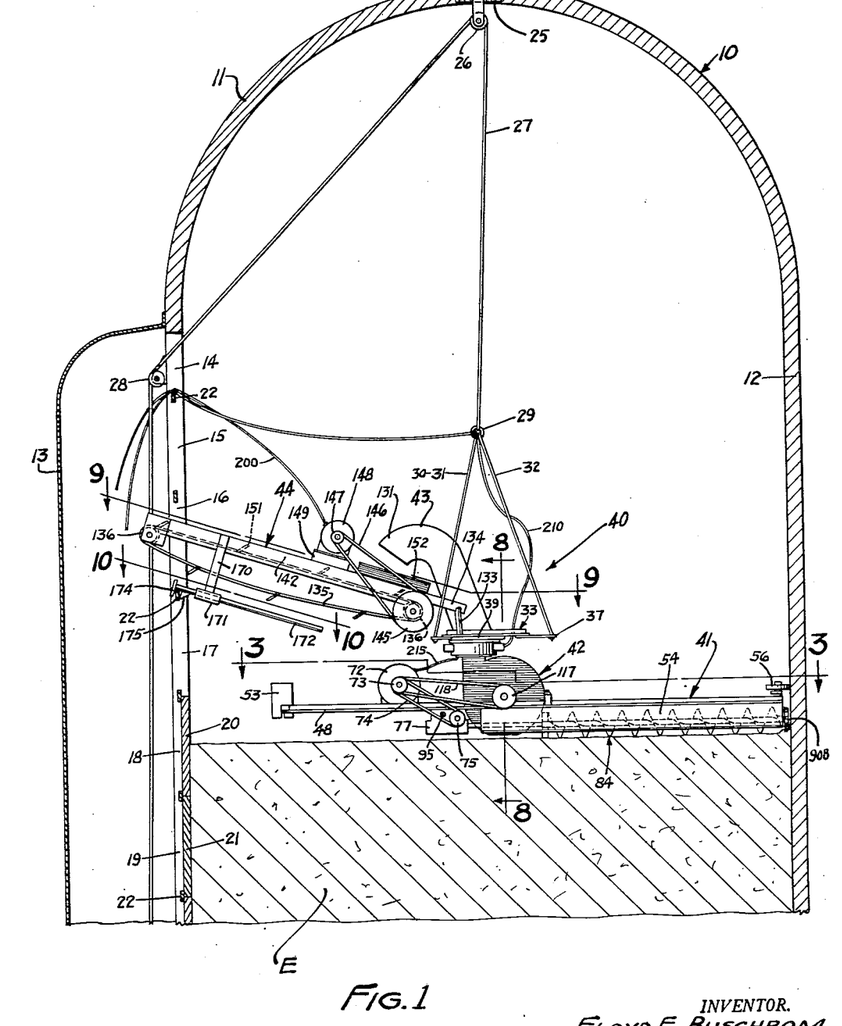
Figure 1 is a front elevational view of a silo unloader embodying my invention, shown in operating position in a silo, and with the walls of the silo shown in vertical section.

Referring now to the drawings and particularly to Figure 1, there is shown a silo generally designated 10 capped by a hollow semi-spherical dome 11, having a vertical cylindrical wall 12 and an exterior chute 13. Dome 11 and chute 13 are seated and secured respectively to cylindrical wall 12 in any of the conventional well-known manners which will not be described in greater detail inasmuch as they form no part of this invention. It is to be understood that this invention may be used with silos having a dome, or having a cap of other than semi-spherical configuration or no cap at all, and having walls which are out of round, all within the scope of the invention.

Figure 10:
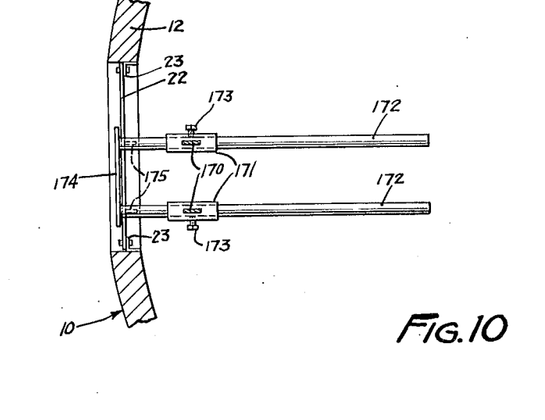
Figure 10 is a substantially horizontal sectional view taken along the line and in the direction of the arrows 10—10 of Figure 1 and showing the means for positioning the ejector means of my invention.

Disposed in the wall 12 of the silo 10 underneath the cover of exterior chute 13 is the conventional plurality of vertically positioned rectangular apertures 14—19. These and like apertures extend all the way down, or to the bottom of the silo, and are provided with a plurality of doors as shown at 20 and 21 for apertures 18 and 19 which are seated against cross members 22 and retained in position by the ensilage E. Cross members 22 (Figure 10) are shown as metal brace members secured to angles 23, angles 23 and members 22 serving to provide a facing for the doors as 20—21. In many instances, however, angles 23 and members 22 may be replaced by wood substitutes.

As shown in Figure 1, when the ensilage E is stored in the silo, the doors, which may be hinged or removable, but are usually removable, are placed in the corresponding apertures such as 18 and 19 and are retained therein by the pressure from the packed ensilage.

Secured to the top of the dome 11 is a bracket 25 which is bolted or otherwise suitably attached thereto, and is provided with a sheave 26. Cable 27 extends over sheave 26 and a similar sheave 28 secured to wall 12 on the silo and thence downwardly to a winch or other suitable elevating and depressing means. Cable 27 is secured at the other end by suitable means to ring 29 to which are also secured cables 30, 31 and 32.

Figure 2:
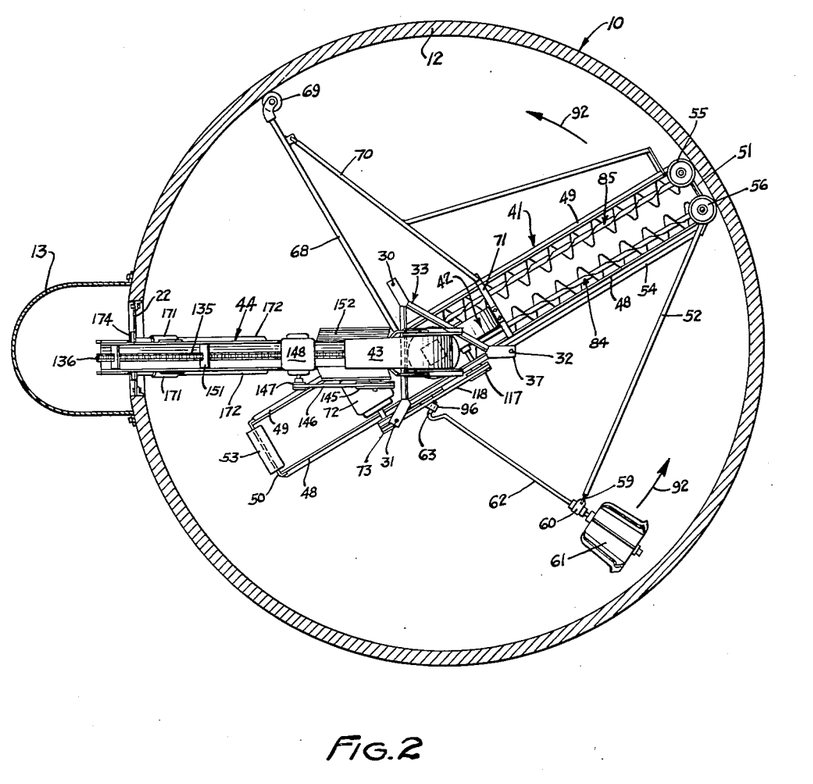
Figure 2 is a top plan view of the unloader of Figure 1, shown in position within a silo and with the walls of the silo shown in horizontal section.

The silo unloader 40 is thus suspended from the dome 11 by the single cable 27 connected to three cables 30, 31 and 32, joined to the ring bolt 29 and to a triangular frame 33 as shown best in Figure 2. The suspension of the unloader by the single center cable 27 allows free radial movement of the unloader in the silo and also facilitates the elevation and let down of the unloader. The triangular suspension provided by cables 30—32 promotes a leveling of the unloader in the silo and consequent efficient operation.

Figure 9:
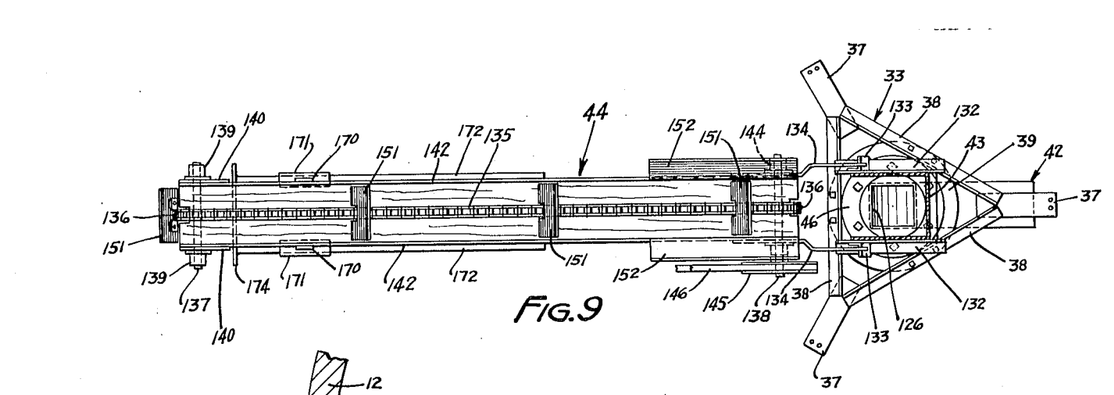
Figure 9 is a horizontal sectional view take along the line and in the direction of the arrows 9—9 of Figure 1 and showing the discharge or ejector means of my invention.

Frame 33 is shown best with reference to Figure 9, comprises apex extensions 37 and connecting angle members 38. Members 38 are bolted to the suspension ring 39 and serve to support the unloader thereby.

The unloader, generally designated 40, comprises a gathering or collecting arm means 41 comprising a rotary auger means as later explained, an elevating means 42 positioned at the center of the unloader, a discharge chute 43 and an ejector means 44, all of which are supported by split support ring 45—46 from suspension ring 39 as explained later.

As will be seen with reference to Figure 1, the main body portion of the unloader is kept from turning by the positioning of the ejector means 44 with reference to the chute 13 and the cross bars 22 as will be more fully explained hereinafter.

Figure 3:
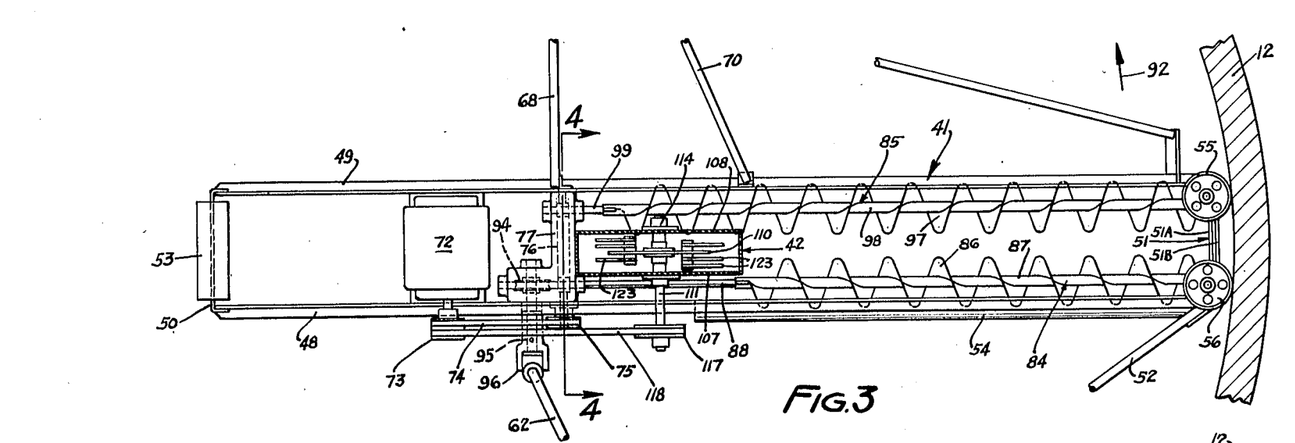
Figure 3 is a horizontal sectional view taken along the line and in the direction of the arrows 3—3 of Figure 1.

The collecting means 41 comprises a frame having angle iron members 48 and 49 which are secured together by cross members 50 and 51, all as shown in Figures 2 and 3. The cross member 50, illustrated best in Figure 3, comprises an extending strap, having inturned ends welded or otherwise suitably secured to the angle members 48 and 49.

The cross member 51 comprises a strap member 51A similar to strap member 50 and a second strap member 51B connected to a pusher brace 52.

It may be noted, with reference to Figures 1 and 2, that the collecting mechanism or radial gathering arm 41 has an extension a little greater than the radius of the silo and that a counterbalance 53 is provided on cross brace 50 to balance the weight of the collecting arm 41.

Connected to the horizontal flange of angle member 48, as shown in Figure 1, is an auger shield 54 which extends longitudinally along the entire length of the collecting arm and is positioned adjacent the trailing auger 84. This shield is in the form of a longitudinally extending concave section having its concavity positioned adjacent the flight of the trailing auger 84.

A pair of guide wheels for engaging the interior surface of wall 12 are provided at 55 and 56 and are supported by member 57 attached to the gathering arm 41. These wheels 55—56 serve to engage the inner surface of the wall 12 of the silo and thus control the movement of the radial collecting arm 41 as it rotates.

Referring now to Figure 2, there is shown the pusher brace 52 connected to the radial gathering arm 41, and connected by hook 59 to drive hub shaft bearing 60. A ribbed drive hub 61 is connected to the end of drive hub shaft 62 which has an inturned end 63 connected to universal coupling 96. A guide rod 68 has one end connected to brace 49 and the other end connected to a caster wheel 69 which also rotates on the interior surface of the wall 12. A brace 70 has one end provided with a hook passed through an aperture in a flange on the rod 68 and the other end is welded or otherwise secured to member 41 at its juncture with cross brace 71. Braces 48 and 49 serve to support the motor 72 which drives a multiple sleeved pulley 73 which through a belt 74 and pulley 75 drives the radial gathering arm 41. Pulley 75 is driven by V-belt 74 and is secured to an auger drive shaft 76 situated in a transmission case 77. Transmission case 77 is provided with a head plate 78 secured thereto by bolts which may be removed for repairs or inspection. Provided within the transmission is an oil bath for the moving parts, as is conveniently known.

The shaft 76 is provided with reduced end portions which are supported in bearings 79 and a pair of oppositely directed worms 80 and 81. Worm 80 mates with pinion gear 82 and worm 81 mates with pinion gear 83 for driving the helical conveying augers 84 and 85.

Figures 4, 5:
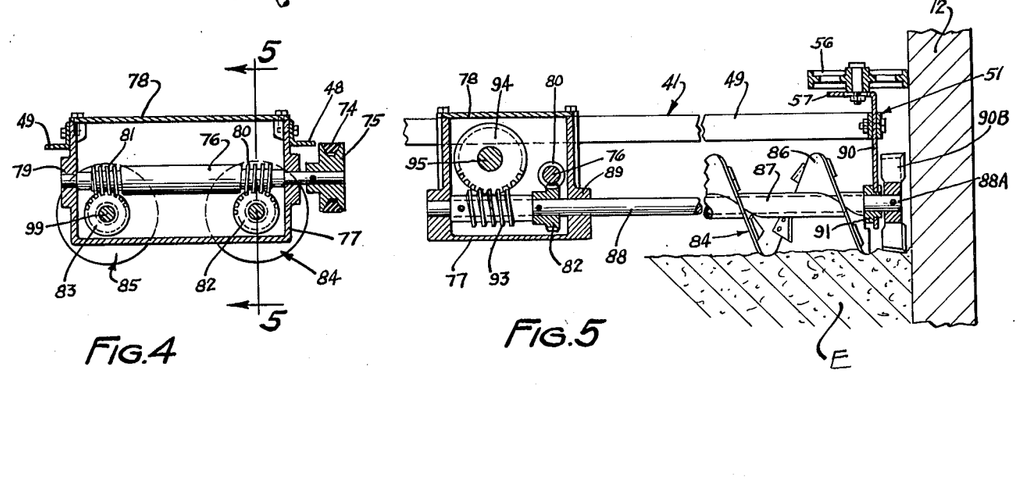
Figure 4 is a vertical sectional view taken along the line and in the direction of the arrows 4—4 of Figure 3.
Figure 5 is a vertical sectional view taken along the line and in the direction of the arrows 5—5 of Figure 4.

Auger 84 comprises a helical flight or auger spiral 86 connected to a hollow shaft 87 having a shaft rod 88 secured to the left end thereof with reference to Figure 3, and a shaft rod 88A connected to the right end as shown in Figure 5. Shaft 88, as shown best with reference to Figure 5, is supported at the left end in bearing block 89 of the transmission case 77 and has pinion gear 82 secured thereto which is driven by the worm 80 as aforementioned. It is supported at the right end by a bearing plate 90, in which is positioned bearing 91 in which rotates shaft rod 88A. It will be obvious from inspection of Figures 3, 4 and 5, and particularly of the pinion 80, gear 82 and flight 84, that as the conveyor rotates in the direction of the arrow 92, the flight of auger 84 will rotate in a direction opposite the direction of travel of the radial gathering arm 41, or in other words, to force ensilage from right to left with reference to Figure 3.

Secured to the leftwardly extending end of shaft rod 88 with reference to Figure 5 is a worm 93 which rotates pinion gear 94, which is connected by shaft 95 to universal joint 96 for rotating shaft 62 and consequently the drive hub 61. Thus, whenever the auger 84 is rotating, the drive hub 61 will be likewise rotating on the surface of the ensilage E to drive the unloader in the direction of the arrow 92 of Figure 2.

Auger 85 is provided with a flight 97 which is similar to flight 86 but extends a greater distance leftwardly with respect thereto as shown in Figure 3. This is done so that the elevating means 42 may be provided with a rearwardly depending shield 107 adjacent the auger 84 but need not be provided with a shield adjacent auger 85. Thus, as the unloader is rotating in the direction of the arrow 92, ensilage will be collected by the augers 84 and 85 and by virtue of the extension of the auger 85 may be fed forwardly into the elevating means as well as laterally. The provision of the depending shield 107 prevents any ensilage from passing therebehind. However, it is to be understood that the length of the flight of auger 84 may likewise be extended or the length of the flight auger 85 may likewise be shortened, so that they are of equivalent lengths or as otherwise desired without departing from the spirit and scope of this invention. It is also to be understood that while a housing has been provided for the elevating mechanism and that while the preferred embodiment of this mechanism has such a housing, that such a housing may be dispensed with, if desired.

Flight 97 of auger 85 is also integrally connected to a hollow shaft 98 similar to shaft 87, having a shaft rod 99 at the left end thereof and a shaft rod similar to rod 88A at the right end, not shown. Rod 99 is connected to pinion 83 and is likewise driven by the rotation of pulley 75 as will be apparent from Figures 3 and 4. Thus, whenever the drive hub 61 is operating, the auger 85 will likewise be operating to rotate in the direction of the travel of the unloader to force ensilage from right to left and into the elevating means with reference to Figure 3.

Each of the augers 84 and 85 are provided with a paddlewheel wall cutter 90B, shown for auger 84 in Figure 5.

The ensilage elevating means, generally designated 42, comprises a mechanical elevator having features similar to the conventional hammer mill and is perhaps best shown in Figures 6, 7, 8 and 11.

Figure 8:
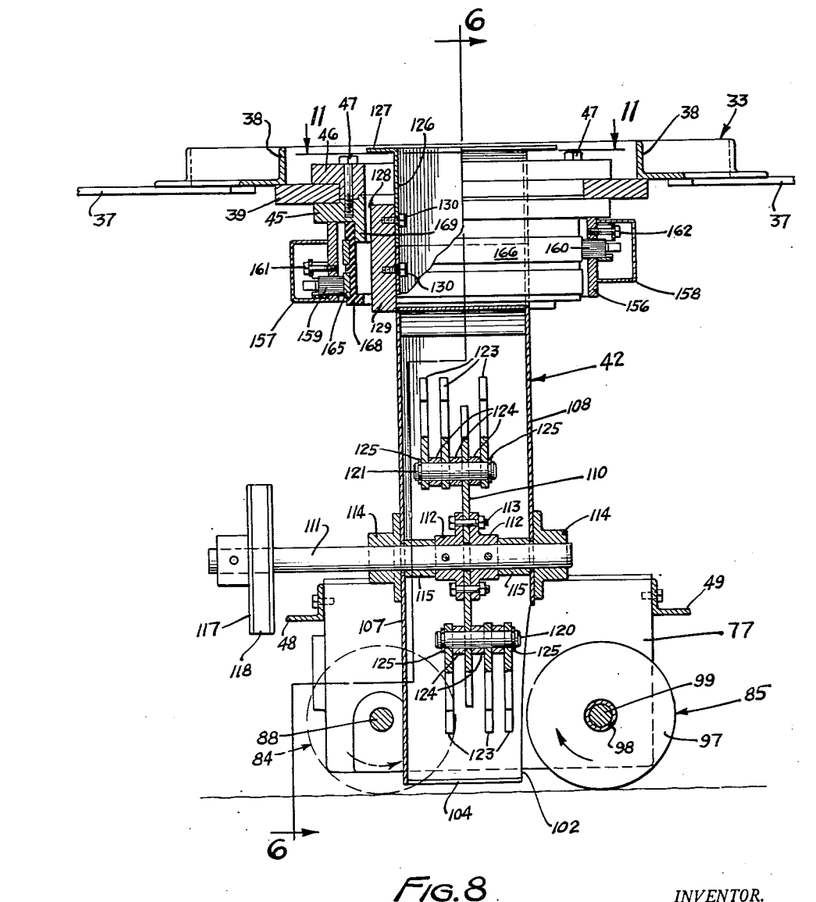
Figure 8 is a modified vertical sectional view of the elevating means of my invention taken along the line and in the direction of the arrows 8—8 of Figure 1.

This mechanism comprises a scroll 100 of sheet metal having an open bottom at 101 and having the leading side 108 thereof removed to a height above the auger as shown at 102 in Figure 8. Thus, the scroll comprises a first wrap 103 terminating at edge 104, and a second wrap 105 terminating at edge 106, wraps 103 and 105 cooperating to provide a peripheral side or end walls of the scroll. Secured to wraps 103 and 105 are scroll plates 107 and 108, which cooperate to provide the face walls of the scroll.

Figures 6, 7, 11:
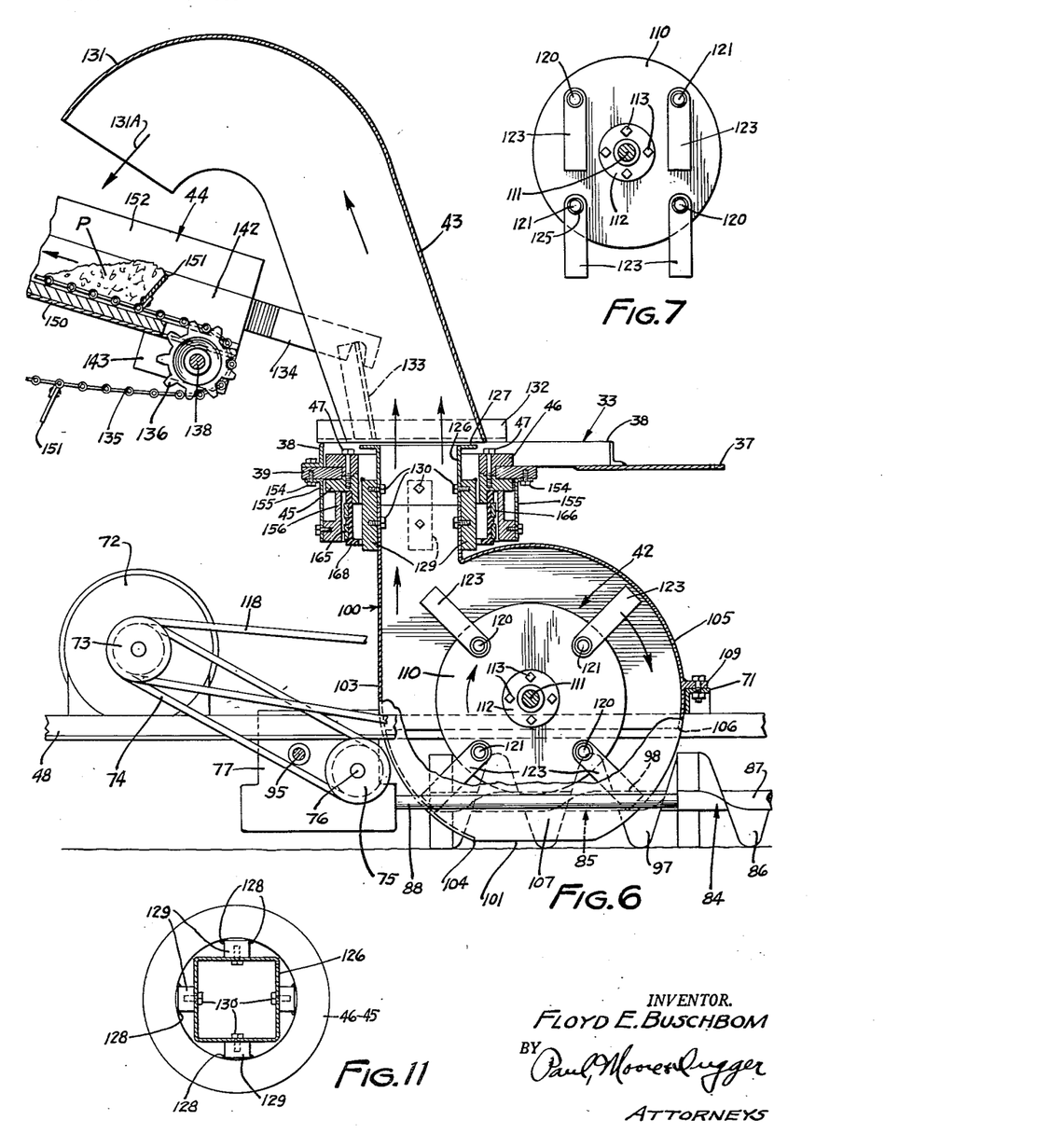
Figure 6 is a vertical sectional view of the elevating means of my invention taken along the line and in the direction of the arrows 6—6 of Figure 8.
Figure 7 is a side elevation of the preferred modification of the rotary impeller of my invention in rest position.
Figure 11 is a fragmentary horizontal sectional view taken along the line and in the direction of the arrows 11—11 of Figure 8.

Wrap 105 is provided as shown best with reference to Figures 2 and 6, with a transverse web 109 which is secured by bolts to cross brace 71 for providing support for the scroll 100.

From inspection of the drawings, and in particular Figures 6 and 8, and upon reading the above description, it will be apparent that there is provided a scroll having a circular body section and a tangential outlet therefrom.

Disposed within the circular body section is a rotary impeller comprising a disk 110 secured to the shaft 111 by a pair of flanged retainers 112 pinned to the shaft. Flange retainers 112 are secured to the disk 110 by a plurality of bolts 113 passed therethrough and through the disk 110. Shaft 111 is in turn retained in position in the sheet metal scroll 100 by a pair of bearing blocks 114 secured thereto. A pair of sleeve extensions 115 serve as spacers to position retainers 112 and disk 110 within the scroll body and with reference to the side plates 107 and 108. Pinned or otherwise secured to the exterior end of the shaft 111 is a sheave 117 which is driven by the V-belt 118 passed over multiple sheave 73, which is in turn driven by motor 72.

Secured to the disk 112 is a plurality of pivot pins 120 and 121 which are, in this instance, welded thereto. With reference to Figures 7 and 8, it will be seen that in these figures, four pivot pins are provided in two opposed pairs. Pivot pins 120 and 121 are identical except that pins 120 are displaced to the right with reference to Figure 8 and pins 121 are displaced to the left with reference to Figure 8. Positioned on each one of the pins 120 and 121 is a plurality of hammers 123 separated by spacers 124. Thus, on pins 121, there is provided a single hammer 123 separated from the disk 110 by a spacer 124 on the short extension of the pin (right extension with reference to Figure 8). On the long extension of the pin 121 (left extension with reference to Figure 8) is provided two hammers 123 separated from each other by a spacer 124 and likewise separated from the disk 110 by a spacer 124. Positioned adjacent the exterior hammers 123 are keepers comprising split rings 125 seated in annular grooves in pins 121. The hammers, spacers and keepers for pins 120 are identical with those on pins 121 except as to position. Thus, with reference to Figure 8, on the rightward or long extension of each pin 120 is positioned two hammers 123 and on the leftward or short extension of pin 120 is the single hammer 123.

The alternate displacement or staggering of the extension of pins 120 and 121 and consequently the alternate displacement or staggering of the hammers 123 provides that the ensilage will not be contacted by successive hammers travelling in the same vertical plane and consequently there is imparted to the surface of the ensilage a chopping, tearing and twisting action which serves to loosen the ensilage surface. This provision also allows the hammers 123 on one of the pins 120 or 121 to be tipped backwardly past the hammers of the succeeding pin when the disk 110 is in rotation, and the hammers 123 in the position of Figure 6 and one of the hammers encounters an obstruction. The alternate staggering likewise adds balance to the disk 110 as it rotates.

The disk 110 rotates forwardly with reference to Figure 8 or in a clockwise direction with reference to Figures 1 and 6, and thus serves to engage the ensilage fed thereto by operation of the augers 84 and 85 and elevate the ensilage through the tangential outlet of the scroll 41 and the ejector means 44.

Inasmuch as the hammers 123 are loosely secured on pins 120 and 121 and separated by spacers, there is a slight amount of axial play, and when the disk is at rest, the hammers will assume the position of Figure 7. However, when the disk is in motion, as shown in Figure 6, the hammers will assume fully extended radial position and will strike the ensilage to impart a severe throwing of, and velocity thereto. The loose pivoting of the hammers on the shafts is advantageous, not only since the hammers may assume the rest position of Figure 7 and thus prevent freezing or clogging of the machine due to long rest periods, but also insures an amount of give in the hammers whenever hard objects are encountered in the ensilage. When the disk 110 is in the inoperative or rest position of Figure 7, only one (or at the most two) of the hammers 123 can be in contact with the ensilage E. If this hammer should freeze down, the others having pivoted from the radial position of Figure 6 as disk 110 comes to rest, will not and thus there is little chance that sufficient force will be exerted to prevent the initial rotation of disk 110. Furthermore, the pivoted hanging of the hammers allows any frozen hammer to be tilted out of contact with the ensilage, and consequently a breaking away rather than a pulling will result as disk 110 begins to rotate. Consequently, the load on the frozen hammer is not transferred to disk 110 all at once and a certain momentum may be accumulated before the load is completely assumed by the disk.

Secured to the support ring 45 by welds 128 is a square chute extension 126, as seen best in Figures 6, 8 and 11. This extension is provided with a terminal flange 127. Four blocks 129 are welded at 128 to ring 45 and are secured to the extension 126 and to the tangential outlet of scroll 100 by a plurality of bolts 130 as shown in Figures 6 and 8. The securing of the scroll 100 to the extension 126 by means of these blocks 129 thus provides support for the scroll and other mechanism.

Positioned above the extension 126 and cooperating therewith is chute 43 of U-cross-section, having its open face directed leftwardly with reference to Figure 6. The chute is provided with a curved end 131 directed to guide ensilage to the ejector means 44. The chute is secured to the vertical flanges of a pair of angle braces 132 positioned across the triangular frame 33 as shown best with reference to Figures 6 and 9. Secured to each one of the braces 132 is a substantially vertical angle brace 133 as shown in Figures 1 and 6. One of each of these braces 133 is positioned adjacent and exterior of the wall of the chute 43 and attached to each one of the braces 132. These braces serve to support hook extensions 134 of the discharge means 44.

Referring now to Figures 1, 2, 6, 9 and 10, the ejector means 44 is shown comprising an endless flat agricultural chain 135 supported on a pair of sprockets 136 which are in turn pinned or otherwise secured to shafts 137 and 138. Shaft 137 is retained by bearing blocks 139 secured to a pair of depending webs 140, which depend from the sides 142 of the ejector means 44. Sides 142 are inflexible extending steel plates and likewise serve to support a pair of depending webs 143 which support bearing blocks 144 in which is journalled shaft 138 of the other sprocket 136. Shaft 138 is provided at its exterior end with a V-belt pulley 145 around which is passed a V-belt 146 which is also passed around the pulley 147 driven by motor 148. Motor 148 is supported upon a downturned U-member 149, the open flanges of which are welded or otherwise secured to the sides 142. A bottom 150 is welded or otherwise secured to sides 142 and is provided with end notches to accommodate sprockets 136 and the endless chain 135.

Bottom 150 serves as a support for the upper run of the endless chain 135 and to support the paddles 151 and the ensilage pushed along thereby. Thus, a channel is formed by sides 142 and bottom 150 in which the endless chain 135 and the pusher paddles 151 serve to traverse the ensilage from right to left with reference to Figures 1 and 9, and thus out into the silo chute 113.

A pair of angled guide flanges 152, shown in Figures 1, 6 and 9, are provided adjacent the leading end of the ejector or discharge means 44. Flanges 152 are angled upwardly and outwardly with reference to the bottom 150 and provide a sort of chute or hopper to guide the ensilage discharged from curved portion 131 of chute 43 onto the discharge means 44. Thus, referring specifically to Figure 6, it will be seen that ensilage will be discharged from curved end 131 of chute 43 in the direction of the arrow 131A and will accumulate in small piles P in front of each of the paddles 151. Paddles 151 may be of any desired material and are secured at spaced intervals to cross members of the chain links of the endless agricultural chain 135.

As will be appreciated from an inspection of Figures 1 and 9, the motor 148 serves to drive the leading one of the sprockets 136, or the sprocket positioned underneath the curved end 131. It is of course to be understood that the trailing sprocket 136 on shaft 137 may be driven, if so desired, but in the preferred embodiment of the invention, the leading sprocket 136 on shaft 138 is driven.

The suspension ring 39 serves to support the split ring halves 45 and 46 which are secured together by a plurality of bolts 47 and which cooperate to provide a channel in which suspension ring 39 may travel as the split ring 45—46 rotates along with the unloader relative suspension ring 39. Also, secured to suspension ring 39 by bolts 154 is a plurality of depending strap members 155 to which is secured an annular guard and brush housing support ring 156. Ring 156 is provided with a pair of brush housings 157 and 158 in which are provided brushes 159 and 160. Thus, brush 159 is supported in housing 157 by bolt 161 and brush 160 is supported in housing 158 by bolt 162. The brushes 159 and 160 may be of any conventional type and are provided with a contact face for engaging an annular contact ring. They will not be further explained inasmuch as they form no part of this invention per se. Brush 159 is positioned to contact ring 165 which is the lower of two contact rings, and brush 160 is positioned to contact the upper ring 166. Rings 165 and 166 are supported by an annular insulation member 168 which is pressed on or otherwise secured to flange 169 of split ring half 45.

Depending from the sides 142 of the discharge means 44 is a pair of supports 170, each provided with a sleeve 171, secured to the bottom thereof in which a rod 172 is positioned for axial movement. The exterior ends of the rods 172 are secured to web 174 which depends so that it may be hooked over cross brace 22 as shown in Figure 1. Each of the rods 132 is provided with a tooth 175 spaced apart from web 174, which will abut the other side of cross brace 22, likewise as shown in Figure 1.

If desired, the teeth 175 will be dispensed with on rods 132, and the rods are thus free to slide inwardly and outwardly with reference to the cross brace 22. Likewise, when the teeth are dispensed with, set screws 173 may be provided for sleeve 171 for immovably positioning the rods 172 therein. If the teeth 175 are provided, the set screws 173 are either removed or allowed to remain loose so that rods 172 may reciprocate in sleeves 171. Inasmuch as the gathering arm, generally designated 41, has an extension slightly larger than the diameter of the silo in which it is to be used, it will be apparent that the center of collection of the ensilage, and consequently the mechanism located thereat, will inscribe a small circle at the center of the silo as gathering arm 41 traverses the surface of the ensilage. Consequently, the ejector means 44 will reciprocate slightly leftwardly and rightwardly with reference to Figure 1, and some means for allowing such reciprocation must be provided. I have shown such means to comprise the sleeves 171 and reciprocal rods 172 therein at the exterior end of ejector 41. However, it is to be understood that instead of the hook extensions 134 at the interior end of the ejector means, sleeves 171 and reciprocating rods 172 might be substituted therefor and stationary hook extensions might be provided for engagement with cross brace 22. Likewise, when the teeth 175 are removed and the set screws 173 tightened, the rods 172 can be extended so that they may reciprocate leftwardly and rightwardly on cross brace 22.

Figure 12:
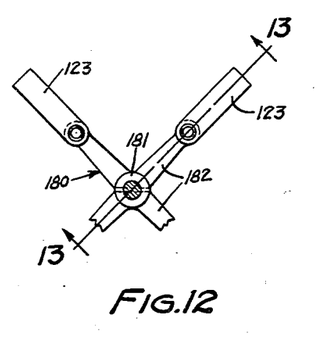
Figure 12 is an end elevational view of a modified form of rotary impeller of my invention.
Figure 13:
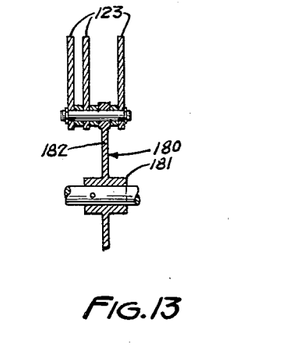
Figure 13 is a vertical sectional view of the modification of Figure 11.

Referring now specifically to Figures 12 and 13, there is shown a modified form of rotary impeller comprising a spider 180, having a sleeve 181 and four extending arms 182 which may be utilized instead of disk 110 for pivotally supporting hammers 123.

Figure 14:
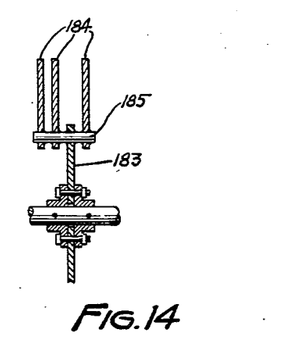
Figure 14 is a vertical sectional view of a third form of rotary impeller.

A less preferred form of rotary impeller is shown in Figure 14, which is provided with a disk 183, similar to disk 110, to which are attached non-pivoted hammers 184 by shaft 185. Shaft 185 is welded or otherwise fixedly secured to both the hammers 184 and the disk 183. However, this modification does not provide the preferred features of pivotally secured hammers which the preferred embodiment provides.

Figure 16:
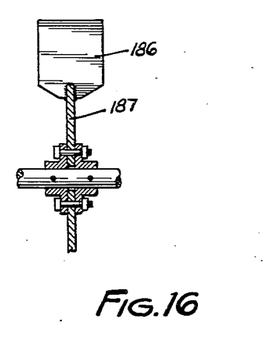
Figure 16 is a vertical sectional view of still another form of rotary impeller.

Referring to Figure 16, a still lesser preferred form of rotary impeller is shown in which non-pivoted paddles 186 are secured to a disk 187 similar to disk 110.

Figure 15:
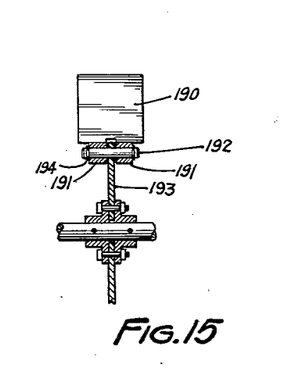
Figure 15 is a vertical sectional view of another form of rotary impeller.

Shown in Figure 15 is a modification in which is provided a square pivoted paddle 190 similar to paddle 186 which is provided with spaced apertured extensions 191 through which a pivot pin 192 is positioned. Pin 192 is passed through the apertures in extensions 191 and the aperture in disk 193 and secured in position by split keeper rings 194 positioned in annular depressions in pin 192.

It is to be understood that the preferred embodiment of the rotary impeller of this invention comprises a plurality of pivoted hangers pivoted to a disk as shown in Figures 6 and 7. Less preferred forms of the rotary impeller comprise hammers pivoted to the spider of Figure 12 and paddles pivoted to the disk of Figure 15. Forms of still lesser preference of this rotary impeller comprise those of Figures 14 and 16, in which the hammers or paddles are affixed and non-pivotal.

The particular advantage of the hammer form of construction in preference to the paddle form is that energy is not wasted in unnecessarily moving a mass of air upwardly to the ejector means but the ensilage is moved wholly by the throwing or impact of the hammers. While the ensilage is likewise moved upwardly wholly by the throwing or impact of the paddles, when this modification is used, there is a tendency to force air upwardly therewith which forms no function and consequently is not necessary.

It may be noted specifically with reference to Figures 6 and 8 that the hammers 123 do not normally contact the surface level of the ensilage E but are positioned to rotate thereabove and to receive ensilage fed thereinto by the conveyors 84 and 85.

Figure 17:
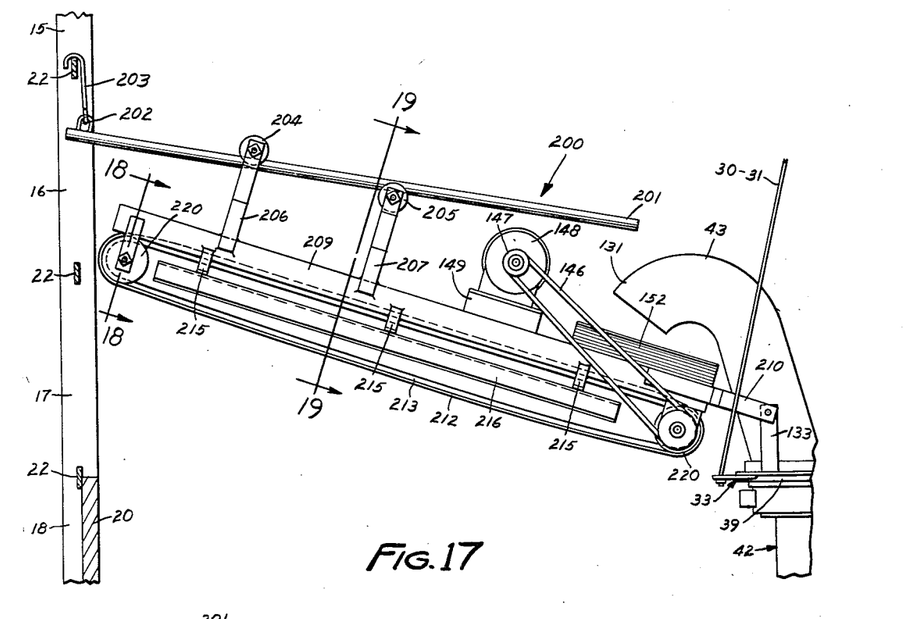
Figure 17 is an elevational view of another form of discharge means of my invention.
Figure 18:
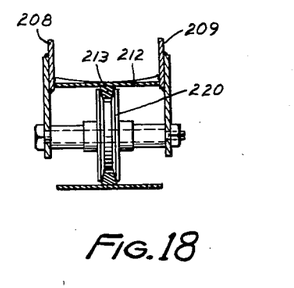
Figure 18 is a sectional view taken along the line and in the direction of the arrows 18—18 of Figure 17.
Figure 19:
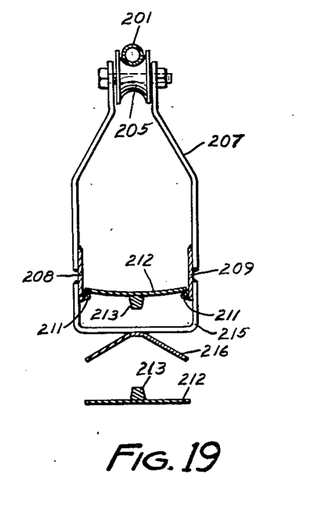
Figure 19 is a sectional view taken along the line and in the direction of the arrows 19—19 of Figure 17.

Referring now specifically to Figures 17-19, there is shown a second form 200 of ejector means. This modification 200 comprises an extending bar or rod 201 having secured to one end thereof a clevice 202 to which is attached a hook 203. Hook 203 is positioned over one of the cross members 22 and serves to position the exterior end of the rod. A roller 204 is positioned on the upper side of rod 201 with reference to Figure 17 and a second roller 205 is positioned on the lower side. Rollers 204 and 205 are journalled for rotation in hangers 206 and 207 respectively. Thus, it will be seen that the rollers 204 and 205 not only serve to support the ejector means generally designated 200 on bar 201, but also allow reciprocal movement thereof.

Hangers 206 and 207 are each provided with depending arms, one of which is secured to a side plate 208, and the other of which is secured to a side plate 209. Each one of the plates 208 and 209 is provided with an extension 210 pivotally secured to one of members 133. Welded or otherwise secured to plates 208 and 209 is a pair of paralleled supporting rods 211 which serve to support the upper run of an endless belt 212. Belt 212—213 comprises a substantially endless planar member 212 provided with a central endless V-belt 213 sewed or otherwise secured thereto.

At spaced intervals, depending U-supports 215 are attached to plates 208 and 209 and serve to support a lower run shield 216 of the cross-sectional configuration best shown in Figure 19. This shield serves to direct any ensilage which may spill from the upper run of the belt 212—213 away from the lower end of the belt and back to the surface of the ensilage in the silo.

The V-belt 213 is supported upon a pair of pulleys 220, one of which is shown in Figure 18.

Otherwise, the ejector means 200 is substantially identical with the ejector means 44. It will be seen with reference to Figures 17-19, that the ejector means is supported by pulleys 204 and 205 on rod 201 and is free to reciprocate inwardly and outwardly as the silo unloader center reciprocates with reference to the silo walls as previously explained for ejector means 44.

In operation, the unloader is suspended from the dome 11 of the silo 10 by means of a cable 27 passed over pulleys 26 and 28. The exterior end of cable 27 may be attached to a winch or any other convenient means for lowering and elevating the unloader. As the unloader operates to collect ensilage from the surface of the ensilage packed in the silo and to discharge the same through chute 43, the unloader 40 is gradually lowered in the silo. One effective method of providing for this is to allow the unloader to rest upon the surface of the ensilage although tension upon cable 27 may be provided as desired. The motor 148 is provided with a lead wire 200 leading to a source of electrical energy and is provided with a switch, not shown.

When the switch is actuated, motor 148 will commence to rotate, rotating the pulley 145 for leading sprocket 136 and thus causing the endless chain 135 and the paddles 151 to move from right to left with reference to Figures 6 and 9, and thus to eject any material deposited thereon by the chute 43. A similar lead wire 210 connection extends to brushes 159 and 160 from a power source and a second lead wire 215 extends from the contact rings 165 and 166 to motor 72. Thus, motor 72 will commence to rotate, driving pulleys 75 and 117 and thus driving the helical augers 84 and 85, the rotary impeller disk 110 and the drive hub 61. The drive hub 61 will thus drive the collecting arm 41 around the silo in the direction of the arrow 92 forcing ensilage from right to left with reference to Figure 1 and into the hammers 123 which will elevate it through the tangential outlet and extension 126 and via the discharge chute 43 to the ejector means 44. As the motor 72 commences to rotate and thus rotates disk 110, hammers 123 will assume the position of Figure 6 from that of Figure 7. When the motor is de-energized, the hammers will once more assume the position of Figure 7.

Thus, it will be seen that I have provided a new and useful structure designed to carry out each of the objects of the invention as previously discussed.

As many apparently widely differing embodiments of this invention may be made without departing from the spirit and scope thereof, it is to be understood that I do not limit myself to the specific embodiments disclosed herein.

What I claim is:

1. A silo unloader for installation in a silo on the surface of the ensilage comprising means for feeding ensilage from the surface of the ensilage toward the center of the silo, delivery means positioned for receiving and discharging the same from the silo, said entire mechanism being suspended by a single cable at a point adjacent the top of the silo, said single cable being attached to a tripod means at the other end thereof, said tripod means being secured to said unloader at points spaced substantially inwardly from the wall of said silo; for supporting said unloader, and said tripod means, said cable and the structure supported thereby being radially movable within the silo.

2. The apparatus of claim 1 further characterized in that said tripod means comprises three cables affixed to said unloader.

3. In a silo unloader adapted to be positioned on the surface of the ensilage within a silo comprising means for feeding ensilage toward the center of the silo, the improvement of rotary impeller means for receiving and impelling said ensilage comprising a plurality of axially spaced tines rotatable about a horizontal axis.

4. The apparatus of claim 3 further characterized in that said tines are pivoted to a rotatable member.

5. In a silo unloader adapted to be positioned on the surface of the ensilage within a silo comprising means for feeding ensilage toward the center of the silo, the improvement of rotary impeller means for receiving and impelling said ensilage comprising a rotary paddle means pivoted to a rotating member for rotation about a horizontal axis.

6. In a silo unloader, the improvement of means for feeding ensilage in a given direction, means for receiving said ensilage and discharging said ensilage from the silo, including a rotary impeller means positioned for rotation about a horizontal axis and provided with a plurality of asymetrically-positioned tines, and said rotary impeller means being positioned in cooperation with said means for feeding ensilage to receive ensilage fed thereby.

7. The apparatus of claim 6 further characterized in that alternate tines are positioned in the same planes.

8. A silo unloader adapted to be positioned on the surface of the ensilage within a silo having an aperture including means providing a bottom horizontal edge comprising in combination first means for feeding ensilage toward the center of the silo, second means for elevating said ensilage and third means for discharging said ensilage laterally from the silo, said third means comprising a mechanical conveyor means having a longitudinal extension and one end positioned adjacent the center of the silo and adapted to receive ensilage from said second means, and support means supporting the other end in spaced relation from said aperture bottom whereby said third means may reciprocate inwardly and outwardly, and said support means including a slidable connection between said other end and said aperture bottom.

9. In a silo unloader, the improvement of means for feeding ensilage in a given direction, means for receiving and discharging said ensilage from the silo, including a rotary impeller means having a plurality of axially spaced tines positioned thereon in extending relation, and said rotary impeller means being positioned in cooperation with said means for feeding ensilage to receive ensilage fed thereby.

10. In a silo unloader, the improvement of means for feeding ensilage in a given direction, means for receiving and discharging said ensilage from the silo, including a rotary impeller means having a plurality of tines pivoted thereto, and said rotary impeller being positioned in cooperation with said means for feeding ensilage to receive ensilage fed thereby.

11. A silo unloader comprising in combination a collecting arm positioned for rotary movement about a vertical axis, means for rotating said collecting arm about said vertical axis, means positioned adjacent the axis of rotation of said collecting arm for transferral of ensilage collected thereby to a lateral ejection means, means for operating said transferring means, a lateral ejection means positioned to eject material laterally from the silo and means for operating the same, said means for operating said ejection means comprising a first motor and said means for operating said transferral means and collecting arm comprising a second motor.

12. The apparatus of claim 11 further characterized in that said second motor is electrically connected to a power supply by contact rings.

13. In a silo unloader, the improvement of a conveying means comprising spaced elongated means for moving material in a given direction, a rotary impeller journalled for rotation about a horizontal axis positioned between said elongated means for receiving material conveyed thereby, and said horizontal axis being positioned at substantially right angles to said given direction.

14. The apparatus of claim 13 further characterized in that one of said elongated means terminates short of said axis, and the other of which extends therebeyond.

15. The apparatus of claim 13 further characterized in that said impeller is positioned within a scroll housing having an open bottom portion and an open portion on one side thereof.

16. A silo unloader comprising in combination a collecting means adapted to rotate about a vertical axis within a silo, means for receiving ensilage from said collecting means and for discharging the same laterally from the silo including a rotatively stationary means, motor means mounted on said collecting means for rotating the same, means for suspending said unloader from the top of the silo comprising a suspension ring means secured to said stationary means, a supporting ring means engaging said suspension ring means and supported thereby and rotatable with reference thereto and secured to said collecting means for supporting the same, a first contact means connected to said motor and secured to said supporting ring means, a second contact means secured to said suspension ring means and connected to a power supply, said first and second contact means positioned for cooperation for transferring power from said second to said first contact means.

17. The apparatus of claim 16 further characterized in that said first and second contact means comprise a brush and ring contact means.

18. The structure of claim 16 further characterized in that said means for receiving ensilage from said collecting means and for discharging the same from the silo includes an impeller and said motor means mounted on said collecting means also operates said impeller.

19. The structure of claim 16 further characterized by said means for receiving ensilage from said collecting means and for discharging the same from the silo including means operable by a second electric motor connected to said power supply.

20. In a silo unloader having gathering means adapted to convey ensilage to the center of a silo and ejection means adapted to convey ensilage laterally from the silo, the improvement comprising in combination a rotary impeller positioned for rotation around a horizontal axis, contra-rotating augers and said rotary impeller being positioned between said contra-rotating augers and adapted to receive ensilage therefrom.

21. In a silo unloader adapted to be positioned on the surface of ensilage in a silo having means for feeding ensilage to the center of the silo, the improvement comprising a rotary impeller means journalled for rotation about a horizontal axis and for receiving and elevating said ensilage, comprising a plurality of spaced paddle members, said paddle members each being secured for rotation about said axis and to a hub by an intermediate portion or member of substantially smaller axial extension than the axial extension of said paddle members.

22. In a silo unloader, the improvement of a conveying means comprising elongated means for moving material in a given direction, means for receiving and discharging said material from the silo, including a rotary impeller journalled for rotation about a horizontal axis and adjacent the end of said elongated means and to which said material is conveyed in said given direction and into the periphery thereof, and said horizontal axis being positioned at substantially right angles to said given direction.

23. The structure of claim 22 further characterized in that said elongated means extends beyond said rotary impeller axis.

24. In a silo unloader, the improvement of a conveying means comprising elongated means for moving material in a given direction, means for receiving and discharging said material from the silo, including a rotary impeller journalled for rotation about a horizontal axis and adjacent the end of said elongated means and to which said material is conveyed in said given direction, said horizontal axis being positioned at substantially right angles to said given direction, and said rotary impeller being positioned within a scroll housing having an open bottom portion.

25. A silo unloader or the like comprising in combination a collecting means adapted to rotate about a vertical axis within a silo, means for receiving material collected from said collecting means including a suspended rotatively stationary means, motor means mounted on said collecting means for rotating the same, suspension means secured to said stationary means, supporting means engaging said suspension means and supported thereby and rotatable with reference thereto and secured to said collecting means for supporting the same, and contact means on said suspension means and said supporting means for transferring power from a source of power supply to said motor means.

26. The structure of claim 25 in which said means for receiving material comprises a rotary impeller for receiving material collected by said collecting means and for elevating and discharging the same from the silo, said impeller being rotatable about said vertical axis together with said collecting means and also being rotatable about a horizontal axis by said motor for receiving and impelling said material.

27. The structure of claim 25 in which said contact means includes a pair of vertically spaced contact rings and contact elements for engaging the same.

28. The structure of claim 25 in which said contact means includes a pair of spaced contact rings and contact elements for engaging the same, and means providing a substantial closure therefor.

29. In a silo unloader, the improvement of a gathering means for moving material in a given direction, a rotary impeller comprising extending material engaging portions, said impeller rotatable about a horizontal axis, a scroll housing for said impeller having a tangential and vertically directed outlet, said housing providing an open peripheral portion for the reception of material from said given direction and of substantially right angles to the extension of said tangential outlet, and said impeller rotatable in a direction to engage said material for bringing it within said housing and ejecting it through said tangential outlet.

30. In a silo unloader, the improvement of a gathering means for moving material in a given direction, a rotary impeller comprising extending material engaging means, said impeller rotatable about a horizontal axis, a housing within which said impeller rotates, said housing providing a peripheral entrance in which material may be received from said given direction and in substantially tangential direction and an exit from which material may be ejected in a tangential direction and said impeller rotatable to deliver material from said entrance to said exit.

31. The structure of claim 30 in which the direction of rotation of said impeller cooperates with the direction of extension of said exit, for impelling material in a direction tangential to the circle inscribed by the impeller and in the direction of said extension of said exit.

References Cited in the file of this patent

UNITED STATES PATENTS

| | | |
|---|---|---|
| 2,410,611 | Pratt | Nov. 5, 1946 |
| 2,500,043 | Radtke | Mar. 7, 1950 |
| 2,580,306 | Leach | Dec. 25, 1951 |
| 2,634,962 | Eglitis | Apr. 14, 1953 |
| 2,651,438 | Peterson | Sept. 8, 1953 |
| 2,671,696 | McLean | Mar. 9, 1954 |
| 2,677,474 | Long | May 4, 1954 |
| 2,678,241 | Miller | May 11, 1954 |
| 2,719,058 | Van Dusen | Sept. 27, 1955 |
| 2,756,112 | Knutson | July 24, 1956 |